(12) United States Patent
Jeong et al.

(10) Patent No.: US 10,516,446 B2
(45) Date of Patent: Dec. 24, 2019

(54) WIRELESS POWER TRANSMITTER AND METHOD OF CONTROLLING THE SAME

(71) Applicant: WITS Co., Ltd., Yongin-si, Gyeonggi-do (KR)

(72) Inventors: In Wha Jeong, Suwon-si (KR); Young Woon Choi, Suwon-si (KR); Se Joo Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 161 days.

(21) Appl. No.: 15/686,367

(22) Filed: Aug. 25, 2017

(65) Prior Publication Data

US 2018/0083669 A1 Mar. 22, 2018

(30) Foreign Application Priority Data

Sep. 20, 2016 (KR) ........................ 10-2016-0120149

(51) Int. Cl.
| | |
|---|---|
| *H04B 5/00* | (2006.01) |
| *H02J 7/02* | (2016.01) |
| *H02J 50/80* | (2016.01) |
| *H02J 50/10* | (2016.01) |
| *H02J 50/90* | (2016.01) |
| *H02J 50/40* | (2016.01) |

(52) U.S. Cl.
CPC ............ *H04B 5/0037* (2013.01); *H02J 7/025* (2013.01); *H02J 50/10* (2016.02); *H02J 50/90* (2016.02); *H02J 50/40* (2016.02); *H02J 50/80* (2016.02)

(58) Field of Classification Search
CPC .. H02J 50/12; H02J 50/80; H02J 50/40; H02J 50/60; H02J 7/00; H02J 7/02; H02J 7/025; H02J 7/027; H04B 5/00; H04B 5/02; H04B 5/0037; B60L 53/12; H01F 38/14
USPC .......... 307/104, 149, 66, 64, 109, 82; 361/1, 361/139, 45
See application file for complete search history.

(56) References Cited

U.S. PATENT DOCUMENTS

| | | | |
|---|---|---|---|
| 2010/0201204 A1 | 8/2010 | Sakoda et al. | |
| 2014/0233138 A1* | 8/2014 | Gliebe | H02H 1/06 361/45 |
| 2015/0108849 A1* | 4/2015 | Robertson | H02J 17/00 307/104 |
| 2015/0207333 A1* | 7/2015 | Baarman | H02J 5/005 307/104 |
| 2015/0233987 A1* | 8/2015 | Von Novak, III | H02J 7/025 324/701 |
| 2016/0079951 A1* | 3/2016 | Oosumi | H02J 50/12 307/104 |

(Continued)

FOREIGN PATENT DOCUMENTS

| | | |
|---|---|---|
| JP | 2003-189508 A | 7/2003 |
| JP | 2010-183814 A | 8/2010 |

(Continued)

*Primary Examiner* — Fritz M Fleming
*Assistant Examiner* — Jagdeep S Dhillon
(74) *Attorney, Agent, or Firm* — Harness, Dickey & Pierce, P.L.C.

(57) ABSTRACT

A wireless power transmitter includes a switch circuit including switches connected to a transmission resonator; a current detector configured to detect a transient current induced in the transmission resonator; and a controller configured to control the switch circuit and adjust an output of the wireless power transmitter based on an amplitude of the transient current.

18 Claims, 7 Drawing Sheets

(56) References Cited

U.S. PATENT DOCUMENTS

| | | | |
|---|---|---|---|
| 2017/0005525 A1* | 1/2017 | Lecias, Jr. | H01F 38/14 |
| 2017/0229917 A1* | 8/2017 | Kurs | H02J 50/12 |
| 2019/0006885 A1* | 1/2019 | Danilovic | H02J 50/80 |

FOREIGN PATENT DOCUMENTS

| | | |
|---|---|---|
| KR | 2003-0054463 A | 7/2003 |
| KR | 10-2015-0077679 A | 7/2015 |

\* cited by examiner

WIRELESS POWER TRANSMITTER AND METHOD OF CONTROLLING THE SAME

CROSS-REFERENCE TO RELATED APPLICATIONS

This application claims the benefit under 35 USC 119(a) of Korean Patent Application No. 10-2016-0120149 filed on Sep. 20, 2016, in the Korean Intellectual Property Office, the entire disclosure of which is incorporated herein by reference for all purposes.

BACKGROUND

1. Field

This application relates to a wireless power transmitter and a method of controlling the same.

2. Description of Related Art

Wireless technology includes various wireless functions ranging from the transmission of data to the transmission of power. In particular, a wireless power transmission technology capable of wirelessly charging an electronic device with power even when there is no contact between the electronic device and a charger has recently been developed.

However, conventional wireless power transmitters are unable to provide stable wireless charging when a distance between the wireless power transmitter and a wireless power receiver changes.

Furthermore, the conventional wireless power transmitters are too large and too thick to be used in small, slim electronic devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a switch including switches connected to a transmission resonator; a current detector configured to detect a transient current induced in the transmission resonator; and a controller configured to control the switch circuit, and adjust an output of the wireless power transmitter based on an amplitude of the transient current.

The controller may be further configured to control the switch circuit to generate an electric field between the transmission resonator and a reception resonator of a wireless power receiver, and remove the electric field between the transmission resonator and the reception resonator.

The removing of the electric field may induce the transient current in the transmission resonator.

The controller may be further configured to calculate a distance between the wireless power transmitter and a wireless power receiver based on the amplitude of the transient current, and adjust an output of the wireless power transmitter based on the calculated distance between the wireless power transmitter and the wireless power receiver.

The wireless power transmitter may further include an alternating current-direct current (AC-DC) converter configured to receive AC power, convert the AC power to DC power, and provide the DC power to the switch circuit; and the controller may be further configured to calculate a distance between the wireless power transmitter and the wireless power receiver based on the amplitude of the transient current, and adjust an output of the AC-DC converter in response to the calculated distance between the wireless power transmitter and the wireless power receiver being greater than a predetermined distance.

The switch circuit may include a first switch including a first terminal connected to a positive input terminal of the switch circuit and a second terminal connected to a first terminal of the transmission resonator; a second switch including a first terminal connected to the positive input terminal and a second terminal connected to a second terminal of the transmission resonator; a third switch including a first terminal connected to the first terminal of the transmission resonator and a second terminal connected to a negative input terminal of the switch circuit; and a fourth switch including a first terminal connected to the second terminal of the transmission resonator and a second terminal connected to the negative input terminal.

The controller may be further configured to generate an electric field between the transmission resonator and a reception resonator of a wireless power receiver by operating the first switch and the second switch in an ON state and the third switch and the fourth switch in an OFF state to form a first closed loop circuit including the first switch, the transmission resonator, and the second switch.

The controller may be further configured to remove the electric field between the transmission resonator and the reception resonator by operating the first switch and the second switch in an OFF state and the third switch and the fourth switch in an ON state to form a second closed loop circuit including the third switch, the transmission resonator, and the fourth switch.

The removing of the electric field may induce the transient current in one terminal of the transmission resonator included in the second loop; and the current detector may be further configured to detect the transient current induced in the one terminal of the transmission resonator included in the second closed loop circuit.

In another general aspect, a method of controlling a wireless power transmitter includes detecting a transient current induced in a transmission resonator; and adjusting an output of the wireless power transmitter based on an amplitude of the detected transient current.

The method may further include generating an electric field between the transmission resonator and a reception resonator of a wireless power receiver; and removing the electric field between the transmission resonator and the reception resonator to induce the transient current in the transmission resonator.

The generating of the electric field may include forming a first closed loop circuit including the transmission resonator to generate the electric field; and the removing of the electric field may include forming a second closed loop circuit including the transmission resonator to remove the electric field, the second closed loop circuit being different from the first closed loop circuit.

The adjusting of the output of the wireless power transmitter based on the amplitude of the transient current may include calculating a distance between the wireless power transmitter and a wireless power receiver based on the amplitude of the detected transient current; and adjusting the output of the wireless power transmitter based on the calculated distance between the wireless power transmitter and the wireless power receiver.

The adjusting of the output of the wireless power transmitter based on the amplitude of the transient current may include adjusting an operation of a switch circuit of the wireless power transmitter to adjust the output of the wireless power transmitter in inverse proportion to the amplitude of the transient current in response to the amplitude of the detected transient current being equal to or greater than a threshold amplitude.

The adjusting of the output of the wireless power transmitter based on the amplitude of the transient current may include adjusting an operation of an alternating current-direct current (AC-DC) converter of the wireless power transmitter to adjust the output of the wireless power transmitter in inverse proportion to the amplitude of the transient current in response to the amplitude of the detected transient current being less than a threshold amplitude.

In another general aspect, a wireless power transmitter includes a switch circuit configured to receive a direct current (DC) voltage, convert the DC voltage to an alternating current (AC) voltage, and supply the AC voltage to a transmission resonator to supply wireless power to a reception resonator of a wireless power receiver; a detector configured to detect a transient event induced in the transmission resonator by the switch circuit; and a controller configured to control the switch circuit to adjust a magnitude of the wireless power in response to a magnitude of the transient event being greater than or equal to a threshold, and adjust a magnitude of the DC voltage to adjust the magnitude of the wireless power in response to the magnitude of the transient event being less than the threshold.

The magnitude of the transient event may be inversely proportional to a distance between the wireless power transmitter and a wireless power receiver.

The controller may be further configured to control the switch circuit to adjust the magnitude of the wireless power in inverse proportion to the magnitude of the transient event in response to the magnitude of the transient event being greater than or equal to the threshold, and adjust the magnitude of the DC voltage to adjust the magnitude of the wireless power in response to the magnitude of the transient event being less than the threshold.

The transient event may be a transient current; and the controller may be further configured to control the switch circuit to generate an electric field between the transmission resonator and the reception resonator, and remove the electric field between the transmission resonator and the reception resonator to induce the transient current in the transmission resonator.

The controller may be further configured to control the switch circuit to form a first closed loop circuit connected to a positive input terminal of the switch circuit and including the transmission resonator to generate the electric field, and form a second closed loop circuit connected to a negative input terminal of the switch circuit and including the transmission resonator to remove the electric field, the second closed loop circuit being different from the first closed loop circuit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
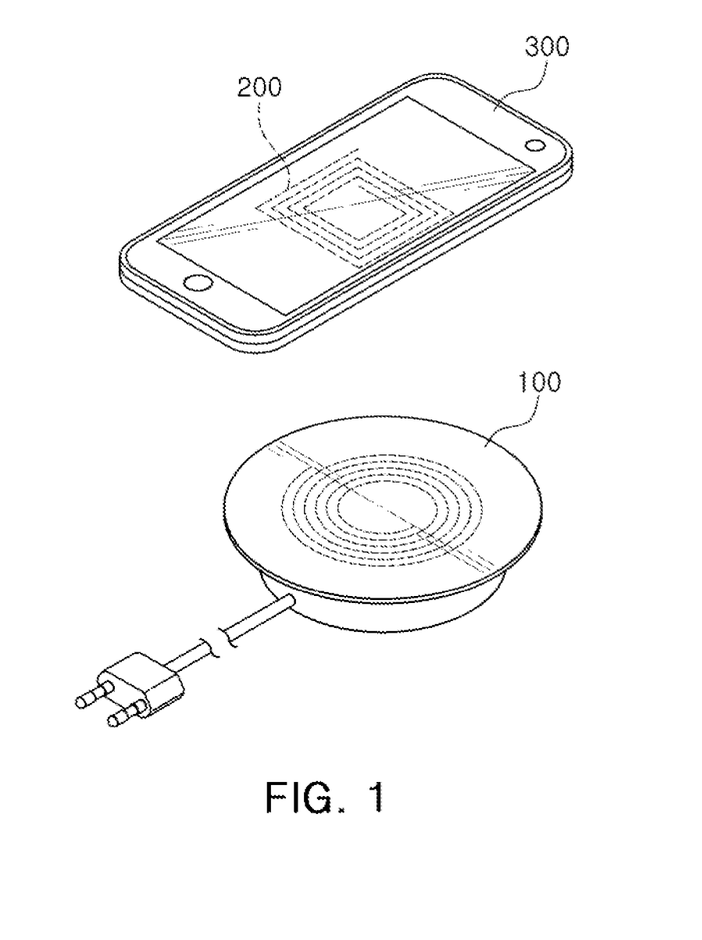
FIG. 1 is a diagram illustrating an example of an application of a wireless power transmitter.

FIG. 1 is a diagram illustrating an example of an application of a wireless power transmitter.

Referring to FIG. 1, a wireless power receiver 200 disposed near a wireless power transmitter 100 is magnetically coupled by magnetic resonance or magnetic induction to the wireless power transmitter 100 to enable the wireless power receiver 200 to wirelessly receive power from the wireless power transmitter 100.

The wireless power receiver 200 provides the received power to an electronic device 300. The wireless power receiver 200 may be a component inside the electronic device 300, or may be a separate device connected to the electronic device 300.

The wireless power receiver 200 may be disposed at a fixed position relative to the wireless power transmitter 100, or a position thereof may be changed.

Even if a distance between the wireless power transmitter 100 and the wireless power receiver 200 increases, the wireless power transmitter 100 is able to provide stable charging by wirelessly transmitting a higher power corresponding to the increased distance.

Figure 2:
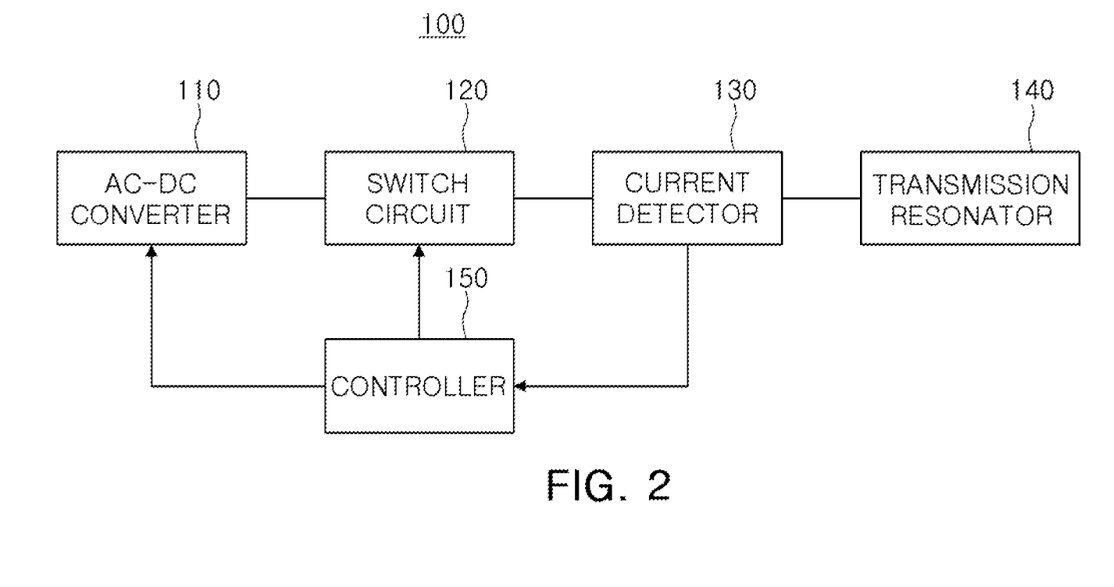
FIG. 2 is a block diagram illustrating an example of a wireless power transmitter.

FIG. 2 is a block diagram illustrating an example of a wireless power transmitter.

Referring to FIG. 2, the wireless power transmitter 100 includes an alternating current-direct current (AC-DC) converter 110, a switch circuit 120, a current detector 130, a transmission resonator 140, and a controller 150. Either one or both of the AC-DC converter 110 and the transmission resonator 140 may be part of the wireless power transmitter 100, or may be a separate device that is not part of the wireless power transmitter 100.

The AC-DC converter 110 receives AC power, converts the AC power to DC power, and provides the DC power to the switch circuit 120.

The switch circuit 120 includes switches (not shown in FIG. 2, but shown in FIG. 4) connected to the AC-DC converter 110 and the transmission resonator 140. Switching operations of the switches enable the switch circuit 120 to generate an AC current from the DC power and provide the AC current to the transmission resonator 140.

The AC current provided from the switch circuit 120 causes the transmission resonator 140 to be magnetically coupled to a reception resonator of a wireless power receiver 200 (not shown in FIG. 2, but shown in FIG. 1) to wirelessly transmit power to the reception resonator.

The current detector 130 detects a transient current induced in the transmission resonator 140. The transmission resonator 140 generates an electric field under control of the controller 150, and as the generated electric field is then removed under control of the controller 150, the transient current is induced in the transmission resonator 140. The current detector 130 detects the transient current (e.g., detects a peak value of the transient current) induced in the transmission resonator 140, and provides the transient current to the controller 150.

The controller 150 controls an operation of the wireless power transmitter 100.

The controller 150 controls an operation of the switch circuit 120 to cause the transmission resonator 140 to generate the electric field, and to remove the electric field generated by the transmission resonator 140. The current detector 130 detects the transient current induced in the transmission resonator 140 by the removal of the electric field, and the controller 150 adjusts an output of the wireless power transmitter 100 to correspond to an amplitude of the transient current.

In one example, the controller 150 adjusts the magnitude of the output of the wireless power transmitter 100 based on the amplitude of the transient current. For example, the controller 150 calculates a distance between the wireless power transmitter 100 and the wireless power receiver 200 based on the amplitude of the transient current, and adjusts the output of the wireless power transmitter 100 based on the calculated distance between the wireless power transmitter 100 and the wireless power receiver 200.

The controller 150 controls an operation of either one or both of the switch circuit 120 and the AC-DC converter 110 to adjust the output of the wireless power transmitter 100. This will be described below in more detail below with reference to FIGS. 3A-3C.

In one example, the controller 150 includes at least one processor. In another example, the controller 150 further includes a memory. The processor may be, for example, a central processing unit (CPU), a graphics processing unit (GPU), a microprocessor, an application specific integrated circuit (ASIC), a field programmable gate array, (FPGA), and may have one or more cores. The memory may be a volatile memory (e.g., a random-access memory (RAM)), a non-volatile memory (e.g., a read-only memory (ROM) or a flash memory), or a combination thereof.

Figure 3A:
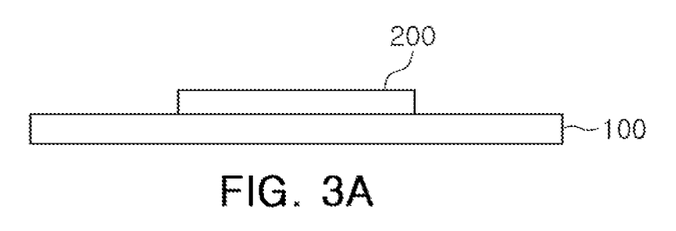
FIGS. 3A-3C are diagrams illustrating examples of different spacings between a wireless power transmitter and a wireless power receiver.
Figure 3B:
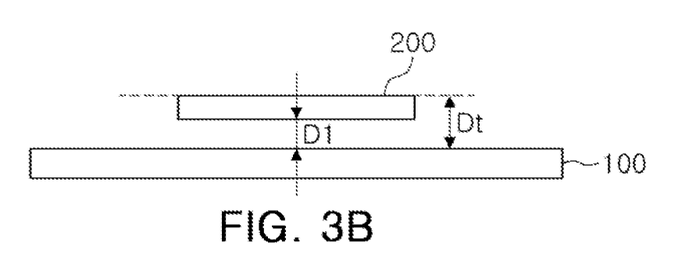
Figure 3C:
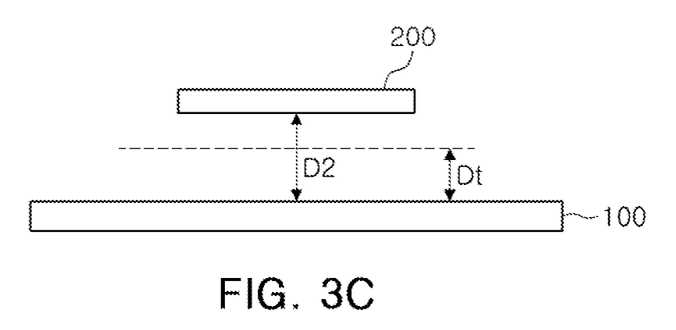

FIGS. 3A-3C are diagrams illustrating examples of different spacings between a wireless power transmitter and a wireless power receiver.

FIG. 3A illustrates an example in which a wireless power receiver 200 is placed on the wireless power transmitter 100, FIG. 3B illustrates an example in which the wireless power receiver 200 is spaced apart from the wireless power transmitter 100 by a distance D1 less than or equal to a predetermined space threshold distance Dt, and FIG. 3C illustrates an example in which the wireless power receiver 200 is spaced apart from the wireless power transmitter 100 by a distance D2 greater than the space threshold distance Dt.

The space threshold distance Dt is a maximum charging distance at which the wireless power transmitter 100 is able to perform stable wireless charging of the wireless power receiver 200 without adjusting an output of the AC-DC converter 110.

That is, in the example illustrated in FIG. 3A in which the wireless power receiver 200 is placed on the wireless power transmitter 100 and the example illustrated in FIG. 3B in which the wireless power receiver 200 is spaced apart from the wireless power transmitter 100 by a distance less than or equal to the space threshold distance Dt, the controller 150 of the wireless power transmitter 100 controls the switching operation of the switch circuit 120 to control the output of the wireless power transmitter 100. In one example, the controller 150 controls the output of the wireless power transmitter 100 by fixing an operating frequency of the switch circuit 120 and variably controlling a switching duty ratio of the switch 120. In another example, the controller 150 controls the output of the wireless power transmitter 100 by fixing the switching duty ratio of the switch circuit 120 and variably controlling the operating frequency of the switch circuit 120. In another example, the controller 150 controls the output of the wireless power transmitter 100 by variably controlling both the operating frequency and the switching duty ratio of the switch circuit 120. However, these are merely examples, and the controller 150 may use other methods to control the output of the wireless power transmitter 100.

However, in the example illustrated in FIG. 3C in which the wireless power receiver 200 is spaced apart from the wireless power transmitter 100 by a distance greater than the space threshold distance Dt, the wireless power transmitter 100 is not able to perform stable wireless charging of the wireless power receiver 200 using a fixed DC voltage output from the AC-DC converter 110. Therefore, the controller 150 controls the AC-DC converter 110 to increase the output of the AC-DC converter 110 to enable the wireless power transmitter 100 to perform stable wireless charging of the wireless power receiver 200 even in the example illustrated in FIG. 3C in which the wireless power receiver 200 is spaced apart from the wireless power transmitter 100 by a distance greater than the space threshold distance Dt.

Since the wireless power transmitter 100 is an integral type that includes the AC-DC converter 110, that is, it includes an AC power adapter as one component, not a separate device, the wireless power transmitter 100 is able to provide a wider charging region by adjusting the output of the AC-DC converter 110, unlike a comparative example using a general AC power adapter having a fixed output.

Figure 4:
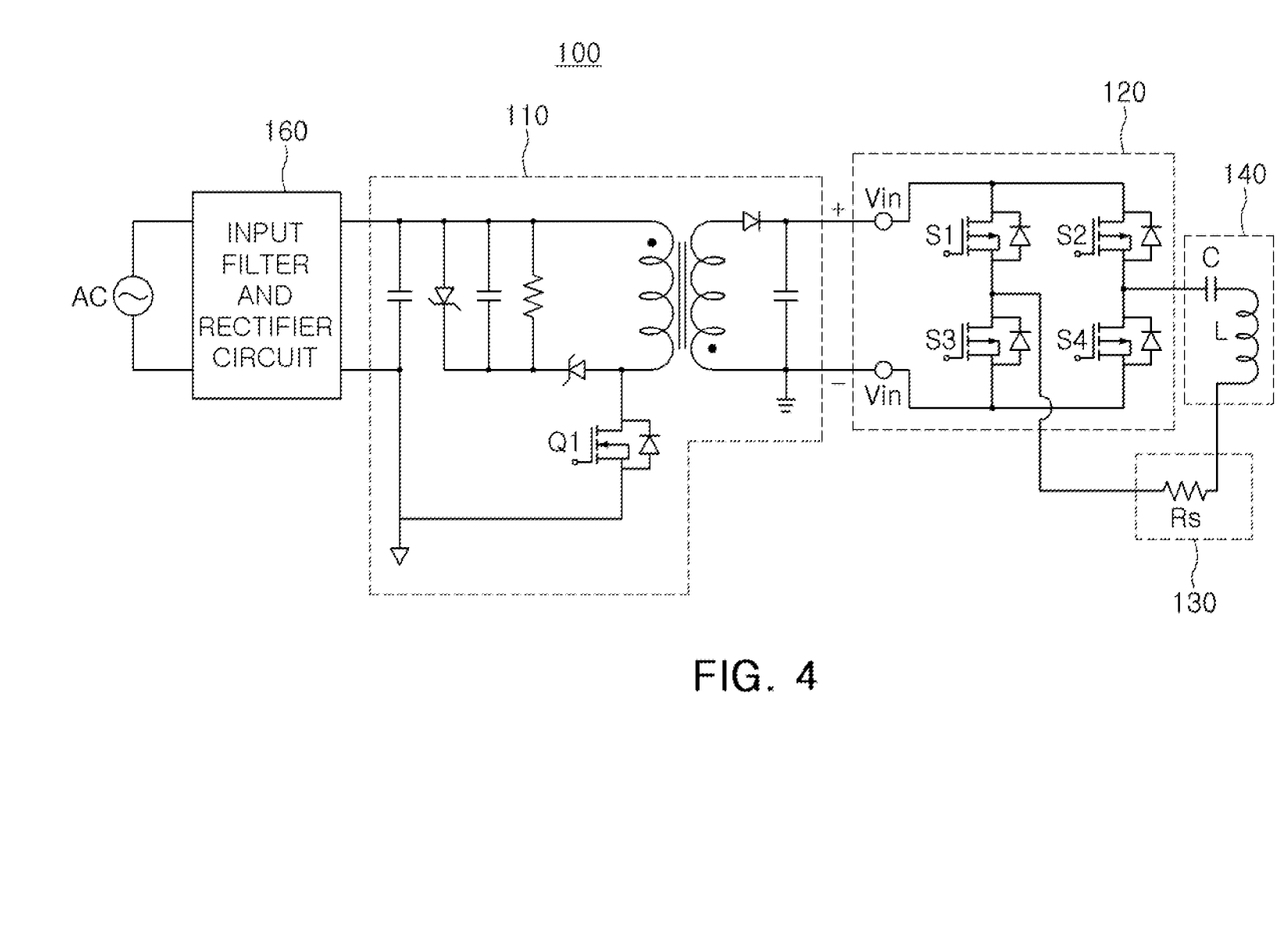
FIG. 4 is a circuit diagram illustrating an example of a wireless power transmitter.

FIG. 4 is a circuit diagram illustrating an example of a wireless power transmitter.

Referring to FIG. 4, the wireless power transmitter 100 includes the AC-DC converter 110, the switch circuit 120, the current detector 130, the transmission resonator 140, and a controller (not shown in FIG. 4, but shown in FIG. 2). Although the controller is not illustrated, the controller may be implemented by at least one processor as described above in connection with FIG. 2. In the example illustrated in FIG. 4, the wireless power transmitter 100 also includes an input filter and rectifier circuit 160.

The input filter and rectifier circuit 160 receives commercial AC power, filters and rectifies the commercial AC power, and provides the filtered and rectified commercial AC power to the AC-DC converter 110. In an example in which the input filter and rectifier circuit 160 is not provided, the AC-DC converter 110 receives the commercial AC power.

The AC-DC converter 110 receives AC power, generates an AC current according to a switching operation of a converting switch Q1, transforms the AC current with a transformer, rectifies the transformed AC current to obtain a DC voltage, and charges a capacitor with the DC voltage to provide DC power that is output to the switch circuit 120.

In the example illustrated in FIG. 4, the converting switch Q1 of the AC-DC converter 110 is on a primary side of the transformer, and the controller (not shown) adjusts a switching operation of the converting switch Q1 to adjust the output of the AC-DC converter 110.

Although FIG. 4 illustrates an example in which the AC-DC converter 110 includes the transformer, this is merely an example, and various other types of AC-DC converting circuits may be used.

A positive input terminal Vin+ and a negative input terminal Vin− of the switch circuit 120 receive the DC power output from the AC-DC converter 110, and the switch circuit 120 performs a switching operation under control of the controller to convert the DC power to an AC current that is output to the transmission resonator 140 and generates an electromagnetic field in the transmission resonator 140. That is, the switch circuit 120 performs the switching operation under control of the controller to generate an electromagnetic field in the transmission resonator 140 to wirelessly transmit power. The controller controls switching operations of switches S1 to S4 in the switch circuit 120 to adjust the AC current output to the transmission resonator 140. In one example, the controller generates the AC current by alternately performing the switching operation for two pairs of switches S1, S4 and S2, S3, and adjusts the magnitude of the wireless power transmitted to the wireless power receiver 200 by adjusting either one or both of a switching duty ratio of the switches and an operating frequency of the switches.

In addition, the switch circuit 120 performs switching operations under control of the controller to generate the electric field between the transmission resonator 140 and the reception resonator of the wireless power receiver 200, and remove the electric field generated between the transmission resonator 140 and the reception resonator of the wireless power receiver 200. That is, when the electric field is generated between the transmission resonator 140 and the reception resonator of the wireless power receiver 200, and the electric field is removed, a transient current is induced in the transmission resonator 140, and the current detector 130 detects the transient current and provides the detected transient current to the controller. In the example illustrated in FIG. 4, the current detector 130 is illustrated as a sense resistor Rs, but this is merely an example, and the current detector 130 may be implemented by various other types of current detectors.

The controller adjusts the output of the wireless power transmitter 100 based on the amplitude of the detected transient current. An example in which the transient current is detected and the output of the wireless power transmitter 100 is adjusted based on the detected transient current will now be described in more detail. First, the controller controls the switching operation of the switch circuit 120 to generate the electric field between the transmission resonator 140 of the wireless power transmitter 100 and the reception resonator of the wireless power receiver 200, and then remove the electric field. This will be described below with reference to FIGS. 5A and 5B.

The transient current is induced in the transmission resonator 140 by the removal of the electric field generated between the transmission resonator 140 and the reception resonator.

An amplitude of the transient current is proportional to the magnitude of the electric field, and since the magnitude of the electric field is inversely proportional to a distance between the transmission resonator 140 and the reception resonator, the controller calculates the distance between the transmission resonator 140 and the reception resonator based on the detected transient current.

The controller controls the output of the wireless power transmitter 100 based on the calculated distance between the transmission resonator 140 and the reception resonator.

In one example, when the amplitude of the transient current is equal to or greater than a threshold amplitude, the controller adjusts an operation of the switch circuit 120 of the wireless power transmitter 100 to adjust the output of the wireless power transmitter 100 in inverse proportion to the amplitude of the transient current. In this example, the threshold amplitude of the transient current is equal to the amplitude of the transient current when the wireless power transmitter 100 is spaced apart from the wireless power receiver 200 by the space threshold distance Dt.

As can be seen from Equation 1 described below, the transient current is proportional to an equivalent capacitance C between a receiving coil of the reception resonator and a transmitting coil of the transmission resonator 140, and the equivalent capacitance C between the receiving coil and the transmitting coil is inversely proportional to a distance d between the receiving coil and the transmitting coil. That is, the amplitude of the transient current is inversely proportional to the distance d between the receiving coil and the transmitting coil.

Therefore, an example in which the amplitude of the transient current is equal to or greater than the threshold amplitude corresponds to the examples in which the distance between the wireless power transmitter 100 and the wireless power receiver 200 is less than or equal to the space threshold distance Dt as illustrated in FIGS. 3A and 3B.

Since this example is an example in which the output of the wireless power transmitter 100 may be sufficiently controlled by only adjusting a switching operation of the switch circuit 120, the controller adjusts the output of the wireless power transmitter 100 by adjusting the switching operation of the switch circuit 120, for example, by changing either one or both of the switching duty ratio and the operating frequency of the switch circuit 120. In this example, the output of the AC-DC converter 110 is not adjusted, but remains constant.

Since the amplitude of the transient current is inversely proportional to the distance between the wireless power transmitter 100 and the wireless power receiver 200, the controller adjusts the switching operation of the switch circuit 120 to decrease the output of the wireless power transmitter 100 as the amplitude of the transient current increases, and increase the output of the wireless power transmitter 100 as the amplitude of the transient current decreases.

In another example, when the amplitude of the detected transient current is less than the threshold amplitude, the controller adjusts the switching operation of the AC-DC converter 110 to adjust the output of the wireless power transmitter 100.

The example in which the amplitude of the transient current is less than the threshold amplitude corresponds to the example in which the distance between the wireless power transmitter 100 and the wireless power receiver 200 is greater than the space threshold distance Dt as illustrated in FIG. 3C. Therefore, wireless power cannot be effectively transmitted to the wireless power receiver 200 spaced apart from the wireless power transmitter 100 by a distance greater than the space threshold distance Dt by adjusting only the switching operation of the switch circuit 120.

Therefore, the controller controls the AC-DC converter 110 to increase the DC voltage output from the AC-DC converter 110, and the switch circuit 120 receives the increased DC voltage and performs the switching operation to effectively transmit wireless power to the wireless power receiver 200 spaced apart from the wireless power transmitter 100 by a distance greater than the space threshold distance Dt.

Since the amplitude of the transient current is inversely proportional to the distance between the wireless power transmitter 100 and the wireless power receiver 200, the controller controls the output of the AC-DC converter 110 so that the output of the AC-DC converter 110 is inversely proportional to the amplitude of the transient current.

In another example, the controller calculates a distance between the wireless power transmitter 100 and the wireless power receiver 200 corresponding to the amplitude of the transient current, and adjusts the output of the wireless power transmitter 100 based on the calculated distance between the wireless power transmitter 100 and the wireless power receiver 200. In one example, the controller accesses prestored data (e.g., a lookup table) in which distances between the wireless power transmitter 100 and the wireless power receiver 200 are stored with corresponding amplitudes (e.g., peak values) of the transient current, and retrieves a distance corresponding to the detected amplitude of the transient current from the data as the calculated distance between the wireless power transmitter 100 and the wireless power receiver 200. The controller adjusts the output of the wireless power transmitter 100 based on the calculated distance.

Figure 5A:
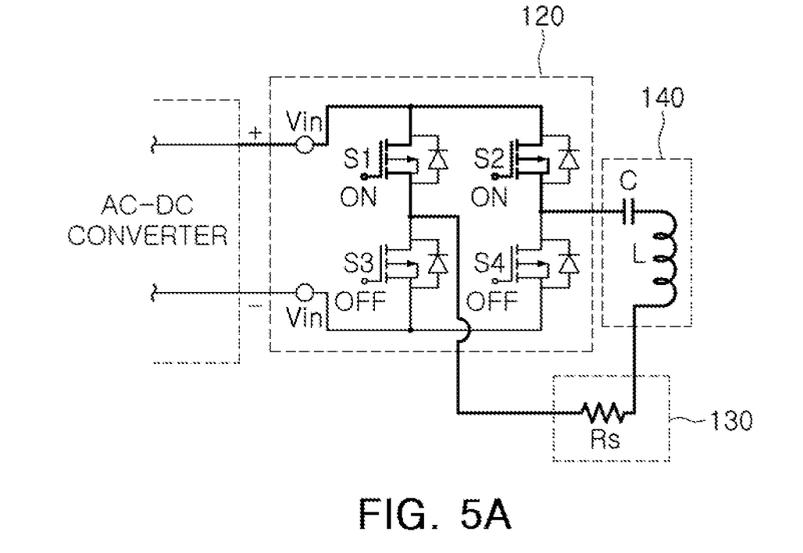
FIG. 5A is a diagram illustrating an example of a state in which an electric field is generated by the wireless power transmitter illustrated in FIG. 4.
Figure 5B:
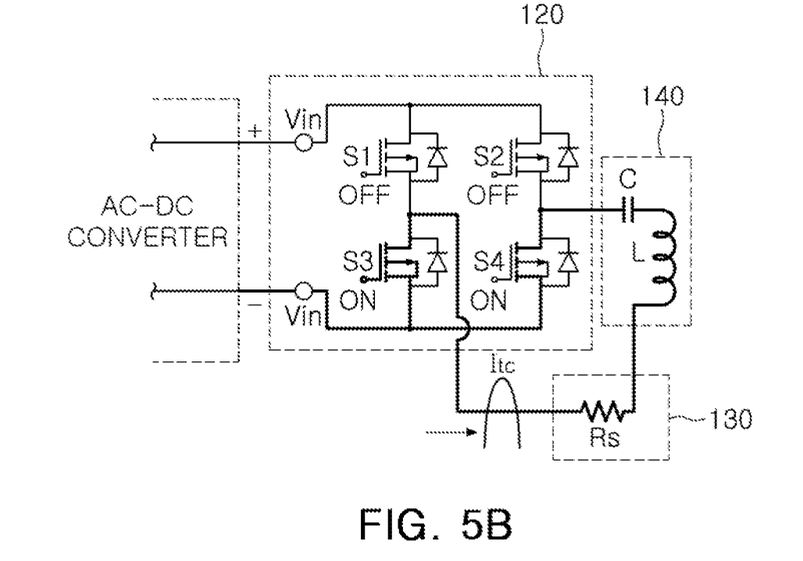
FIG. 5B is a diagram illustrating an example of a state in which the electric field generated in the state illustrated in FIG. 5A is removed by the wireless power transmitter illustrated in FIG. 4.

FIG. 5A is a diagram illustrating an example of a state in which an electric field is generated by the wireless power transmitter 100 illustrated in FIG. 4, and FIG. 5B is a diagram illustrating an example of a state in which the electric field generated in the state illustrated in FIG. 5A is removed by the wireless power transmitter 100 illustrated in FIG. 4.

Hereinafter, an example in which the transient current is detected by generating an electric field using the wireless power transmitter 100 and then removing the electric field will be described with reference to FIGS. 4 through 5B.

In the illustrated example, the switch circuit 120 includes four switches S1 to S4. That is, the switch circuit 120 includes a first switch S1 having a first terminal connected to the positive input terminal Vin+ of the switch circuit 120 and a second terminal connected to a first terminal of the transmission resonator 140, a second switch S2 having a first terminal connected to the positive input terminal Vin+ and a second terminal connected to a second terminal of the transmission resonator 140, a third switch S3 having a first terminal connected to the first terminal of the transmission resonator 140 and a second terminal connected to the negative input terminal Vin− of the switch circuit 120, and a fourth switch S4 having a first terminal connected to the second terminal of the transmission resonator 140 and a second terminal connected to the negative input terminal Vin−.

First, referring to FIG. 5A, the controller generates an electric field between the transmission resonator 140 and the reception resonator of the wireless power receiver 200 by operating the first switch S1 and the second switch S2 in an ON state and the third switch S3 and the fourth switch S4 in an OFF state to form a first closed loop circuit denoted by a bold line in FIG. 5A including the first switch S1, the transmission resonator 140, and the second switch S2.

When it is assumed that the wireless power receiver 200 is spaced apart from the wireless power transmitter 100 by a predetermined distance, and an area of the receiving coil of the reception resonator of the wireless power receiver 200 is equal to an area A of the transmitting coil of the transmission resonator 140 of the wireless power transmitter 100, the equivalent capacitance C between the receiving coil of the reception resonator and the transmitting coil of the transmission resonator 140 may be expressed by the following Equation 1.

$$C = \frac{\varepsilon A}{d} \quad (1)$$

In Equation 1, ε denotes a permittivity between the receiving coil and the transmitting coil, and d denotes a distance between the receiving coil and the transmitting coil.

Thereafter, referring to FIG. 5B, the controller removes the electric field generated between the transmission resonator 140 and the reception resonator by operating the first switch S1 and the second switch S2 in an OFF state and the third switch S3 and the fourth switch S4 in an ON state to form a second closed loop circuit denoted by a bold line in FIG. 5B including the third switch S3, the transmission resonator 140, and the fourth switch S4.

When the electric field between the receiving coil and the transmitting coil changes, that is, when the electric field is removed, a transient current Itc is induced in one terminal of the transmission resonator 140 included in the second closed loop circuit in response to the change.

The amplitude of the induced transient current is proportional to the equivalent capacitance C between the receiving coil of the reception resonator and the transmitting coil of the transmission resonator 140. Therefore, the amplitude of the induced transient current is inversely proportional to the distance between the receiving coil of the reception resonator and the transmitting coil of the transmission resonator 140.

Therefore, as a charging distance decreases, the equivalent capacitance C increases, causing the amplitude of the transient current flowing in the transmitting coil to increase.

In one example, the amplitude (e.g., the peak value) of the transient current is detected, the charging distance is calculated based on the amplitude of the transient current, and the output of the wireless power transmitter 100 is adjusted based on the calculated charging distance.

Various examples of a wireless power transmitter 100 have been described above with reference to FIGS. 1 through 5B.

Now, an example of a method of controlling a wireless power transmitter will be described with reference to FIG. 6.

However, since the method of controlling a wireless power transmitter described below is a method of controlling the wireless power transmitter 100 described above, the method of controlling the wireless power transmitter may be easily understood from the description of FIGS. 1 through 5B above.

Figure 6:
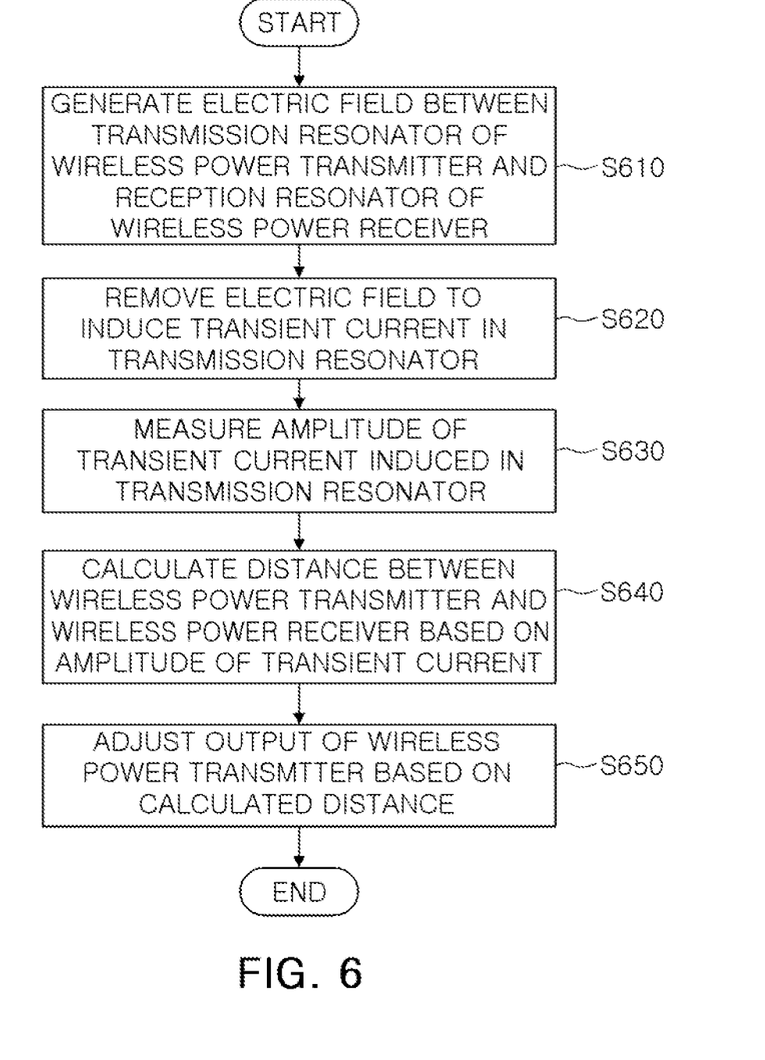
FIG. 6 is a flowchart illustrating an example of a method of controlling a wireless power transmitter.

FIG. 6 is a flowchart illustrating an example of a method of controlling a wireless power transmitter.

Referring to FIG. 6, the wireless power transmitter generates an electric field between the transmission resonator of the wireless power transmitter and a reception resonator of a wireless power receiver (S610).

The wireless power transmitter removes the electric field to induce a transient current in the transmission resonator (S620).

The wireless power transmitter measures the amplitude of the transient current induced in the transmission resonator (S630).

The wireless power transmitter calculates a distance between the wireless power transmitter and the wireless power receiver based on the amplitude of the transient current (S640).

The wireless power transmitter adjusts the output of the wireless power transmitter based on the calculated distance between the wireless power transmitter and the wireless power receiver (S650).

In one example of S610, the wireless power transmitter generates the electric field between the transmission resonator and the reception resonator of the wireless power receiver by forming a first closed loop circuit including the transmission resonator as illustrated in FIG. 5A.

In one example of S620, the wireless power transmitter removes the electric field by forming the second closed loop circuit including the transmission resonator, which is different from the first closed loop circuit, as illustrated in FIG. 5B.

In one example of S650, the wireless power transmitter adjusts the output of the wireless power transmitter by adjusting a switching operation of the switch circuit of the wireless power transmitter when the distance between the wireless power transmitter and the wireless power receiver is less than or equal to the space threshold distance Dt, as in the examples illustrated in FIGS. 3A and 3B.

That is, when the amplitude of the transient current is greater than or equal to the threshold amplitude corresponding to the space threshold distance Dt, the wireless power transmitter adjusts the switching operation of the switch circuit of the wireless power transmitter to adjust the output of the wireless power transmitter in inverse proportion to the amplitude of the transient current.

In another example of S650, the wireless power transmitter increases the output of the wireless power transmitter by adjusting the output of the AC-DC converter when the distance between the wireless power transmitter and the wireless power receiver is greater than the space threshold distance Dt, as in the example illustrated in FIG. 3C.

That is, when the amplitude of the transient current is less than the threshold amplitude corresponding to the space threshold distance Dt, the wireless power transmitter adjusts the output of the AC-DC converter of the wireless power transmitter to adjust the output of the wireless power transmitter in inverse proportion to the amplitude of the transient current.

Figure 7:
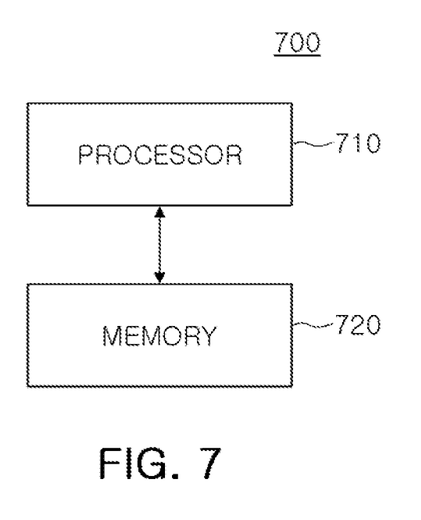
FIG. 7 is a block diagram of an example of a controller of a wireless power transmitter.

FIG. 7 is a block diagram of an example of a controller of a wireless power transmitter.

Referring to FIG. 7, a controller 700 includes a processor 710 and a memory 720. The memory 720 stores instructions that, when executed by the processor 710, cause the processor 710 to perform the functions of the controller 150 in FIG. 2 and the unillustrated controller in FIGS. 4, 5A, and 5B, and also cause the processor 710 to perform the method illustrated in FIG. 6.

The examples of the wireless power transmitter described above provide stable wireless charging even when the distance between the wireless power transmitter and the wireless power receiver changes.

Furthermore, the examples of the wireless power transmitter described above enable a miniaturized and slim wireless power transmitter to be provided because the examples of the wireless power described above are integral types that include an integral AC power adapter, i.e., the AC-DC converter 110. In contrast, a comparative example includes an AC power adapter as a separate component, and thus an overall size of a complete system of the comparative example is larger and thicker than the examples of the wireless power adapter described above.

The controller 150 in FIG. 2, the unillustrated controller in FIGS. 4, 5A, and 5B, and the controller 700, the processor 710, and the memory 720 in FIG. 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 6 that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a switch comprising switches connected to a transmission resonator;
   a current detector configured to detect a transient current induced in the transmission resonator; and
   a controller configured to:
   control the switch circuit, and
   adjust an output of the wireless power transmitter based on an amplitude of the transient current,
   wherein the controller is further configured to:
   calculate a distance between the wireless power transmitter and a wireless power receiver based on the amplitude of the transient current, and
   adjust an output of the wireless power transmitter based on the calculated distance between the wireless power transmitter and the wireless power receiver.

2. The wireless power transmitter of claim 1, wherein the controller is further configured to:
   control the switch circuit to generate an electric field between the transmission resonator and a reception resonator of a wireless power receiver, and
   remove the electric field between the transmission resonator and the reception resonator.

3. The wireless power transmitter of claim 2, wherein the removing of the electric field induces the transient current in the transmission resonator.

4. The wireless power transmitter of claim 1, further comprising an alternating current-direct current (AC-DC) converter configured to:
   receive AC power,
   convert the AC power to DC power, and
   provide the DC power to the switch circuit;
   wherein the controller is further configured to:

adjust an output of the AC-DC converter in response to the calculated distance between the wireless power transmitter and the wireless power receiver being greater than a predetermined distance.

5. The wireless power transmitter of claim 1, wherein the switch circuit comprises:
   a first switch comprising a first terminal connected to a positive input terminal of the switch circuit and a second terminal connected to a first terminal of the transmission resonator;
   a second switch comprising a first terminal connected to the positive input terminal and a second terminal connected to a second terminal of the transmission resonator;
   a third switch comprising a first terminal connected to the first terminal of the transmission resonator and a second terminal connected to a negative input terminal of the switch circuit; and
   a fourth switch comprising a first terminal connected to the second terminal of the transmission resonator and a second terminal connected to the negative input terminal.

6. The wireless power transmitter of claim 5, wherein the controller is further configured to generate an electric field between the transmission resonator and a reception resonator of a wireless power receiver by operating the first switch and the second switch in an ON state and the third switch and the fourth switch in an OFF state to form a first closed loop circuit comprising the first switch, the transmission resonator, and the second switch.

7. The wireless power transmitter of claim 6, wherein the controller is further configured to remove the electric field between the transmission resonator and the reception resonator by operating the first switch and the second switch in an OFF state and the third switch and the fourth switch in an ON state to form a second closed loop circuit comprising the third switch, the transmission resonator, and the fourth switch.

8. The wireless power transmitter of claim 7, wherein the removing of the electric field induces the transient current in one terminal of the transmission resonator included in the second loop; and
   the current detector is further configured to detect the transient current induced in the one terminal of the transmission resonator included in the second closed loop circuit.

9. A method of controlling a wireless power transmitter, the method comprising:
   detecting a transient current induced in a transmission resonator; and
   adjusting an output of the wireless power transmitter based on an amplitude of the detected transient current,
   wherein the adjusting of the output of the wireless power transmitter based on the amplitude of the transient current comprises:
      calculating a distance between the wireless power transmitter and a wireless power receiver based on the amplitude of the detected transient current; and
      adjusting the output of the wireless power transmitter based on the calculated distance between the wireless power transmitter and the wireless power receiver.

10. The method of claim 9, further comprising:
    generating an electric field between the transmission resonator and a reception resonator of a wireless power receiver; and
    removing the electric field between the transmission resonator and the reception resonator to induce the transient current in the transmission resonator.

11. The method of claim 10, wherein the generating of the electric field comprises forming a first closed loop circuit comprising the transmission resonator to generate the electric field; and
    the removing of the electric field comprises forming a second closed loop circuit comprising the transmission resonator to remove the electric field, the second closed loop circuit being different from the first closed loop circuit.

12. The method of claim 9, wherein the adjusting of the output of the wireless power transmitter based on the amplitude of the transient current comprises adjusting an operation of a switch circuit of the wireless power transmitter to adjust the output of the wireless power transmitter in inverse proportion to the amplitude of the transient current in response to the amplitude of the detected transient current being equal to or greater than a threshold amplitude.

13. The method of claim 9, wherein the adjusting of the output of the wireless power transmitter based on the amplitude of the transient current comprises adjusting an operation of an alternating current-direct current (AC-DC) converter of the wireless power transmitter to adjust the output of the wireless power transmitter in inverse proportion to the amplitude of the transient current in response to the amplitude of the detected transient current being less than a threshold amplitude.

14. A wireless power transmitter comprising:
    an alternating current-direct current (AC-DC) converter configured to receive AC power, and convert the AC power to DC voltage;
    a switch circuit configured to receive the DC voltage, convert the DC voltage to an AC voltage, and supply the AC voltage to a transmission resonator to supply wireless power to a reception resonator of a wireless power receiver;
    a detector configured to detect a transient event induced in the transmission resonator by the switch circuit; and
    a controller configured to:
       control the switch circuit to adjust a magnitude of the wireless power in response to a magnitude of the transient event being greater than or equal to a threshold, and
       control the AC-DC converter to adjust a magnitude of the DC voltage in response to the magnitude of the transient event being less than the threshold.

15. The wireless power transmitter of claim 14, wherein the magnitude of the transient event is inversely proportional to a distance between the wireless power transmitter and a wireless power receiver.

16. The wireless power transmitter of claim 14, wherein the controller is further configured to:
    control the switch circuit to adjust the magnitude of the wireless power in inverse proportion to the magnitude of the transient event in response to the magnitude of the transient event being greater than or equal to the threshold, and
    control the AC-DC converter to adjust the magnitude of the DC voltage in inverse proportion to the magnitude of the transient event in response to the magnitude of the transient event being less than the threshold.

17. The wireless power transmitter of claim 14, wherein the transient event is a transient current; and
    the controller is further configured to control the switch circuit to:

generate an electric field between the transmission resonator and the reception resonator, and remove the electric field between the transmission resonator and the reception resonator to induce the transient current in the transmission resonator.

18. The wireless power transmitter of claim 17, wherein the controller is further configured to control the switch circuit to:

form a first closed loop circuit by connecting a positive output terminal of the AC-DC converter and both ends of the transmission resonator to generate the electric field, and form a second closed loop circuit by connecting a negative output terminal of the AC-DC converter and both ends of the transmission resonator to remove the electric field, the second closed loop circuit being different from the first closed loop circuit.

* * * * *